No. 705,084. Patented July 22, 1902.
J. HORMBY.
STENCILING MACHINE FOR BUTTONS.
(Application filed Apr. 17, 1902.)

(No Model.) 6 Sheets—Sheet 1.

WITNESSES:

INVENTOR
John Hormby
BY William R. Baird
His ATTORNEY

No. 705,084. Patented July 22, 1902.
J. HORMBY.
STENCILING MACHINE FOR BUTTONS.
(Application filed Apr. 17, 1902.)

(No Model.) 6 Sheets—Sheet 4.

WITNESSES:
Ernest H. Boyne
S. J. Cox.

INVENTOR
John Hormby
BY William R. Baird
His ATTORNEY

No. 705,084. Patented July 22, 1902.
J. HORMBY.
STENCILING MACHINE FOR BUTTONS.
(Application filed Apr. 17, 1902.)

(No Model.) 6 Sheets—Sheet 5.

WITNESSES:
Ernest H. Boyce
S. J. Cox

INVENTOR
John Hormby
BY William R. Baird
his ATTORNEY

No. 705,084. Patented July 22, 1902.
J. HORMBY.
STENCILING MACHINE FOR BUTTONS.
(Application filed Apr. 17, 1902.)

(No Model.) 6 Sheets—Sheet 6.

WITNESSES:
Ernest H. Boyce
S. J. Cox

INVENTOR
John Hormby
BY William R. Baird
ATTORNEY

THE NORRIS PETERS CO., PHOTO-LITHO., WASHINGTON, D. C.

UNITED STATES PATENT OFFICE.

JOHN HORMBY, OF WOONSOCKET, RHODE ISLAND.

STENCILING-MACHINE FOR BUTTONS.

SPECIFICATION forming part of Letters Patent No. 705,084, dated July 22, 1902.

Application filed April 17, 1902. Serial No. 103,414. (No model.)

*To all whom it may concern:*

Be it known that I, JOHN HORMBY, a citizen of the United States, residing at Woonsocket, in the county of Providence and State of Rhode Island, have invented certain new and useful Improvements in Button-Stenciling Machines, of which the following is a specification.

My invention relates to the painting or coloring of buttons by means of pigments or colors applied to the buttons through stencils.

The object of the invention is to provide a machine whereby buttons in general, but especially buttons made of the well-known ivory-nut or vegetable ivory—such, for instance, as those made by the machine shown and described in Letters Patent of the United States granted to me on the 4th day of October, 1896, and numbered 611,811—may be stenciled with colors in any suitable design or any combination of designs without manual manipulation after the button has been fed into the machine.

With this object in view my invention consists in an improved button-stenciling machine comprising, broadly, a button-carrier, a stencil-carrier, means for moving them intermittently in unison, a pigment-reservoir, and means for projecting pigment from the reservoir through the stencil when it is moved to its position above the button in the carrier.

My invention further consists in the improved construction, arrangement, and combination of the parts of such a machine, as will be hereinafter fully described, and afterward specified in the appended claims.

Figure 1:
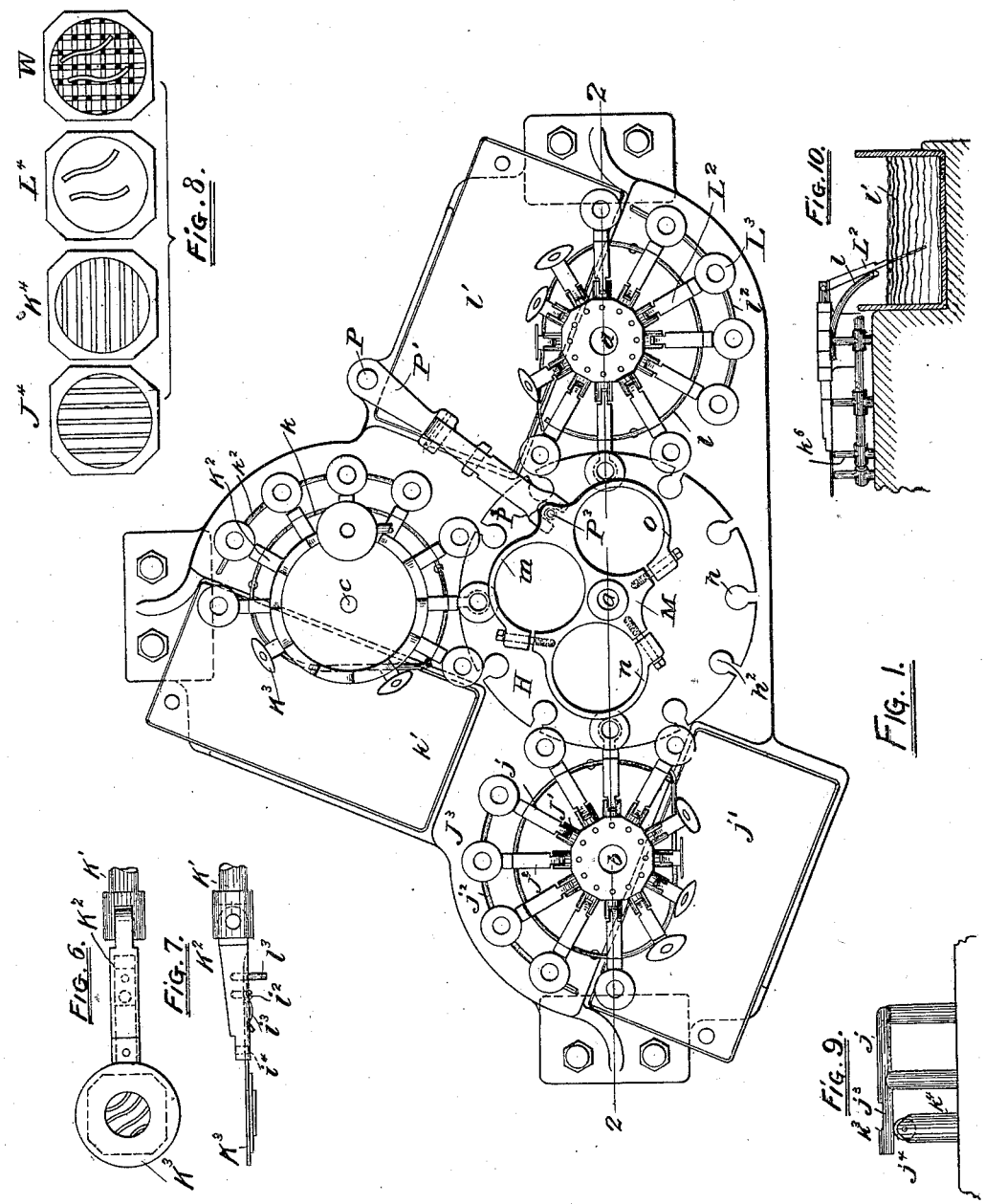
Figure 2:
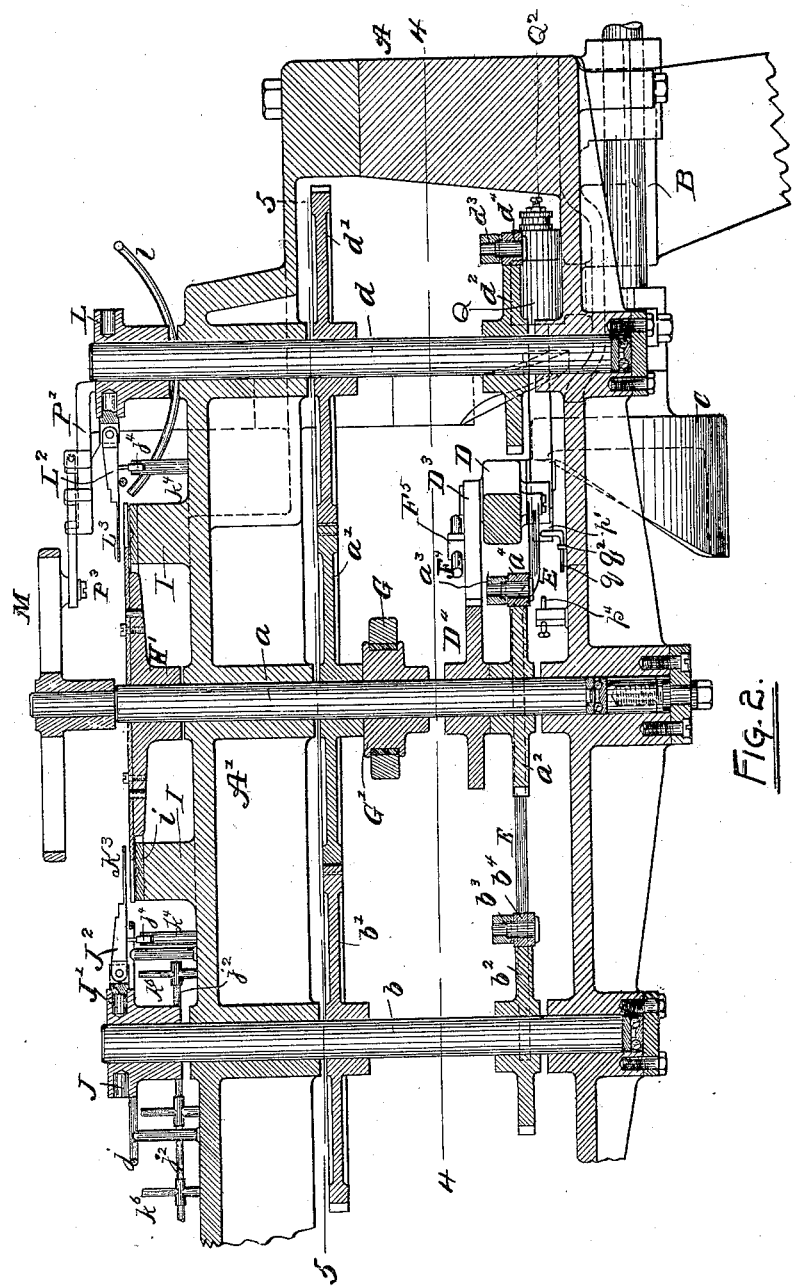
Figure 3:
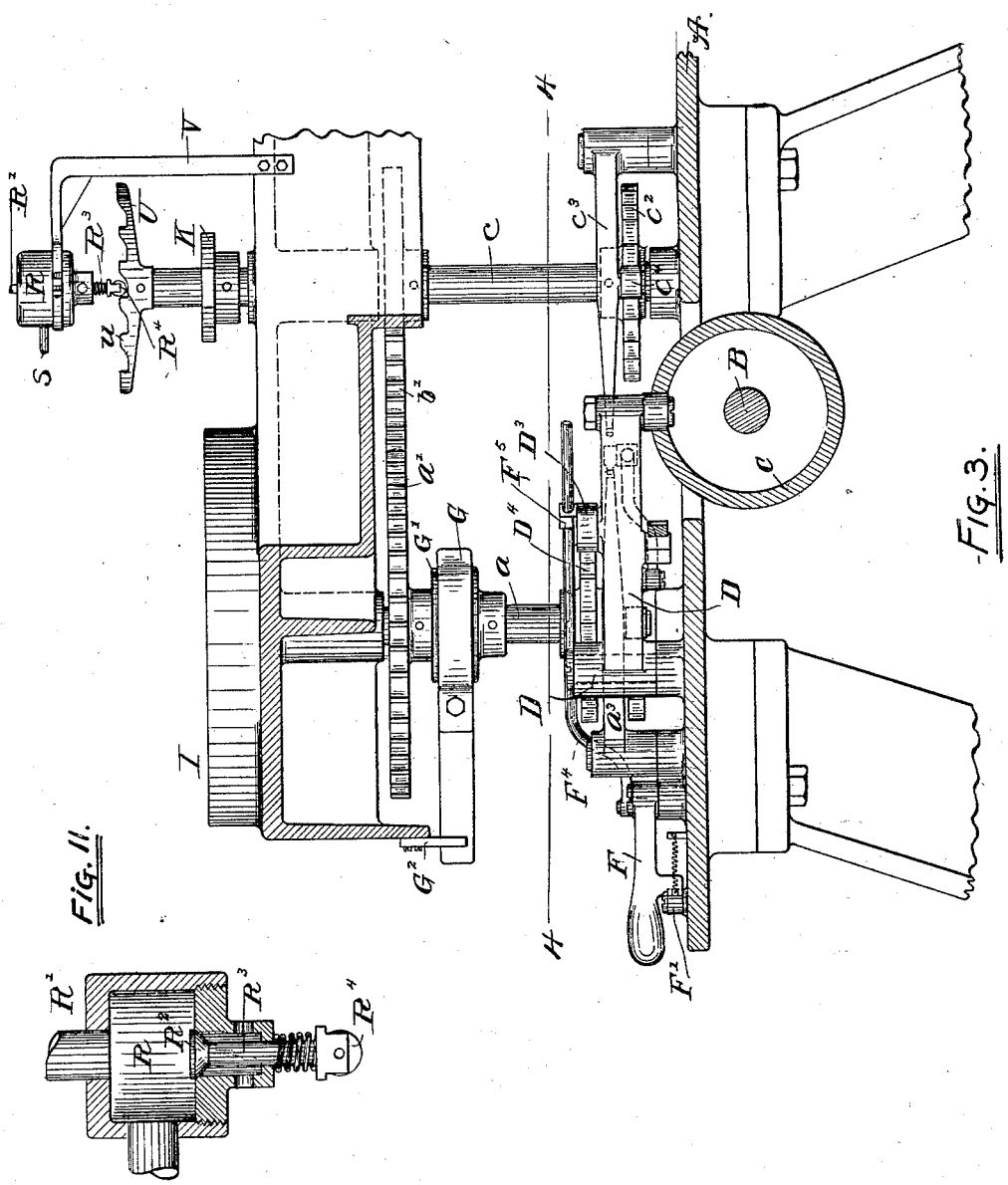
Figure 4:
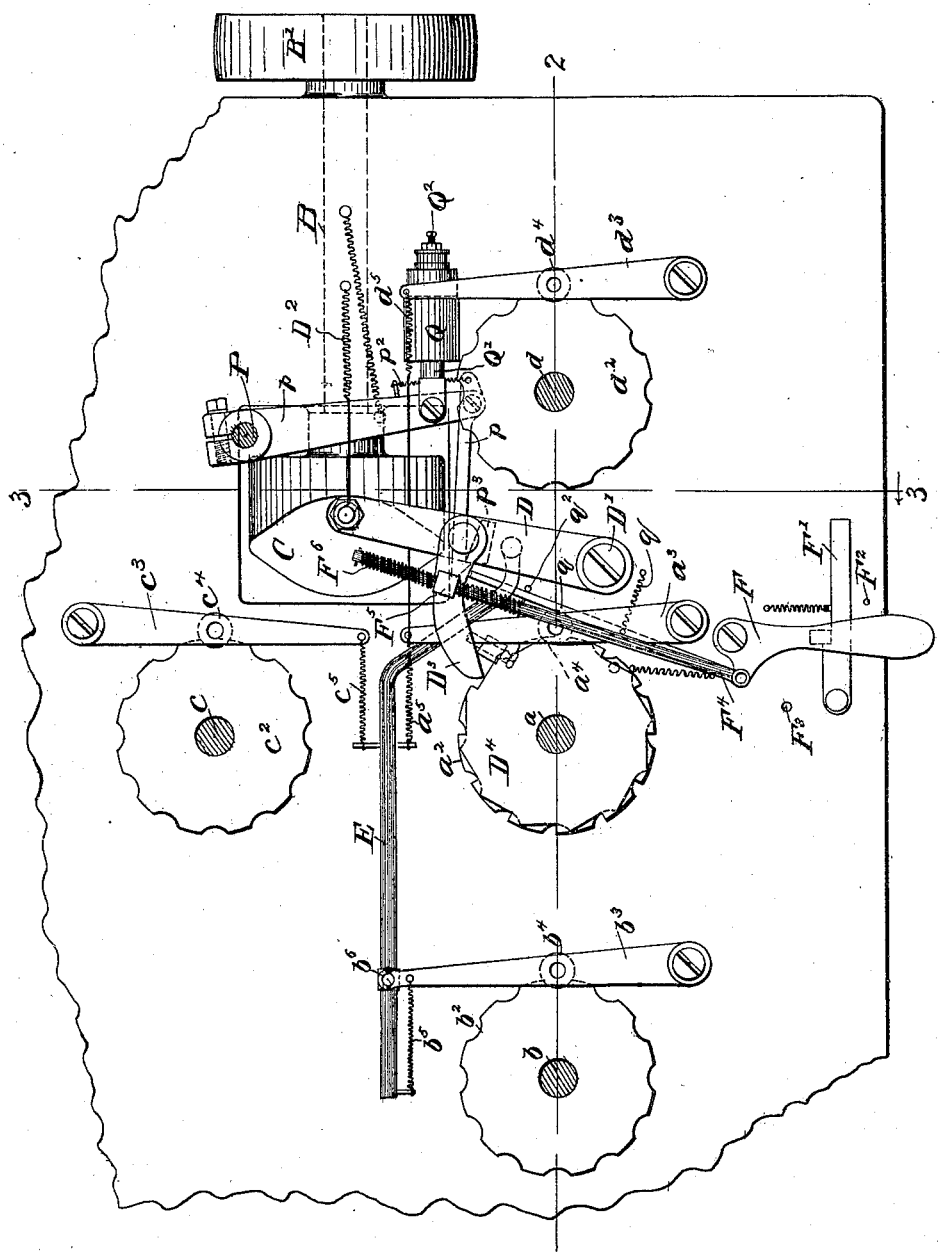
Figure 5:
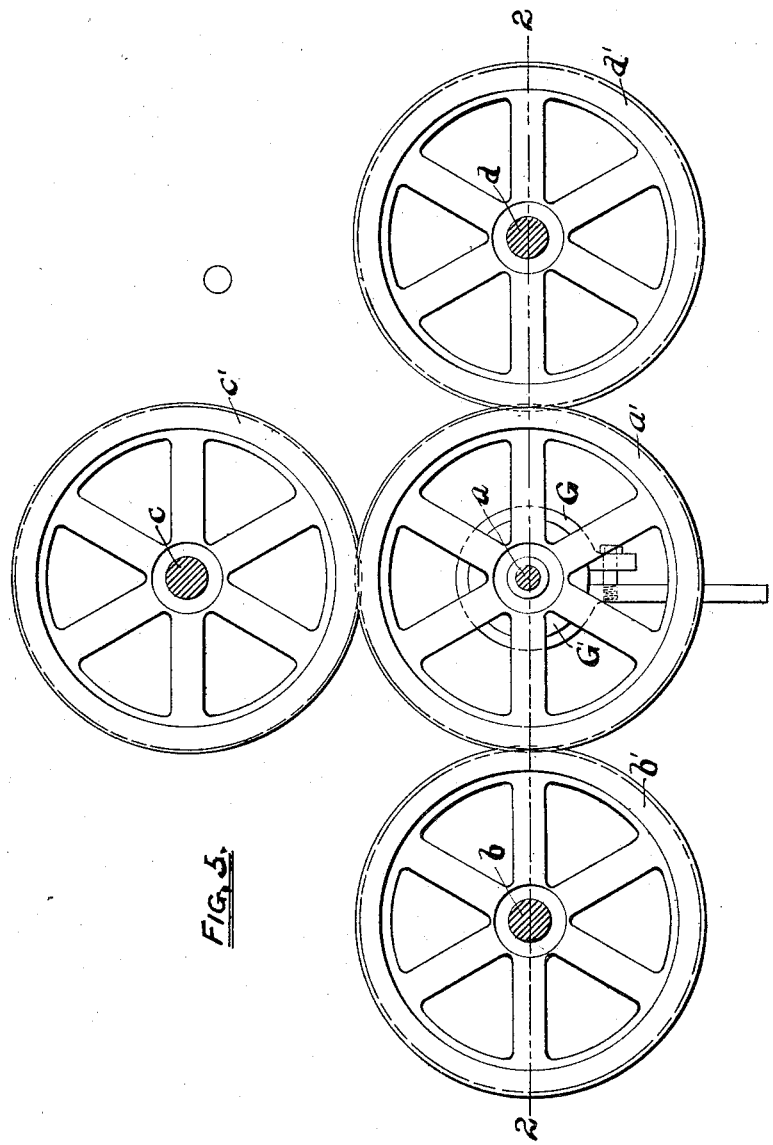
Figure 13:
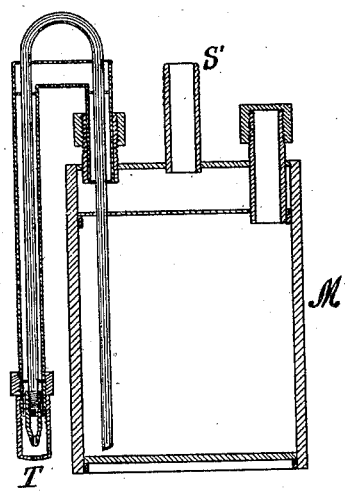
Figure 12:
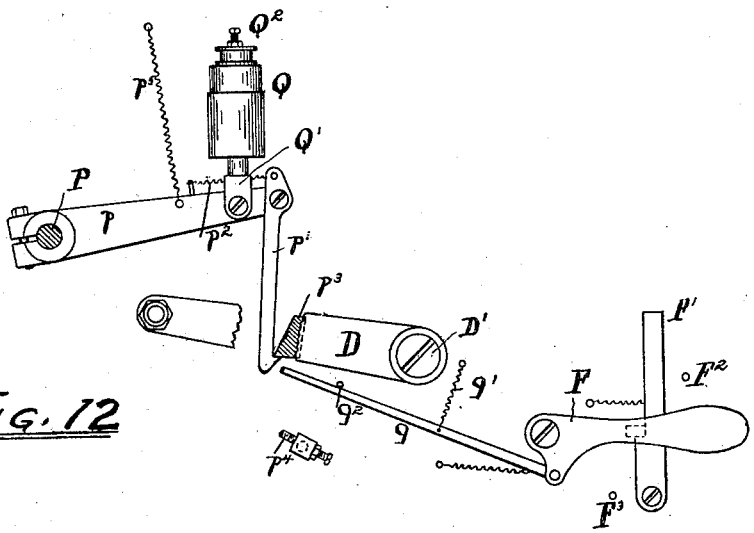

In the accompanying drawings, in which I have illustrated a machine embodying my invention, Figure 1 is a top plan view of the machine with the pigment-reservoirs removed. Fig. 2 is a longitudinal vertical sectional view on the plane of lines 2 2 of Figs. 1, 4, and 5. Fig. 3 is a transverse vertical sectional view on the plane of the line 3 3 of Fig. 4 looking toward the left, as indicated by the arrow. Fig. 4 is a horizontal sectional view on the plane of line 4 4 of Figs. 2 and 3 looking downward. Fig. 5 is a horizontal sectional view on the plane of line 5 5 of Fig. 2 looking downward. Figs. 6 to 13, inclusive, are detail views, of which Fig. 6 is a top plan view, and Fig. 7 a view in side elevation, of a stencil-carrier detached from the machine and having a stencil therein. Fig. 8 shows a trio of stencils and a button stenciled in a combination design thereby. Fig. 9 is a view in elevation of one of the stencil-carrier guides and trippers. Fig. 10 is a view of the means for dropping the stencils in the carriers into a cleansing-bath. Fig. 11 is a sectional view of the air-chamber of the spraying mechanism. Fig. 12 is a fragmentary plan view of the means for oscillating the pigment carrier or reservoir, and Fig. 13 is a vertical sectional view of the sprayer and pigment-reservoir.

Like reference characters indicate the same parts wherever they occur in the several figures of the drawings.

Referring to the drawings by reference characters, A indicates the frame of the machine, which may be made of any appropriate form and any desired material to properly support the various operating parts, cast-iron being usually the preferred material for such structures. In this frame are suitable vertical bearings for four principal shafts $a$, $b$, $c$, and $d$, each of which has a suitable ball step-bearing, as shown especially in Fig. 2. These shafts are geared together in a manner to cause them to move in unison, preferably by means of gear-wheels $a'$, $b'$, $c'$, and $d'$, although other suitable means to this end might be used.

B indicates the horizontal main shaft, driven to rotate continuously from any suitable source of power—as, for instance, a belt leading from a driven shaft to a belt-pulley B', Fig. 4, said shaft B having suitably secured upon it a cam C, by means of which a pawl-lever D, pivoted at one end, as at D', to the frame of the machine and provided with a roller at its opposite end bearing upon said cam, is caused to oscillate on its pivot, the roller being held yieldingly in contact with the face of the cam by a spring $D^2$, secured to the frame. Pivoted to the lever D is a pawl $D^3$, which engages a ratchet-wheel $D^4$ on the shaft $a$ and during the oscillation of lever D imparts an intermittent rotation to said shaft $a$ and through the medium of gear-wheels $a'$ $b'$ $c'$ $d'$ to the shafts $b$, $c$, and $d$ also.

$a^2$, $b^2$, $c^2$, and $d^2$ indicate similar notched disks secured, respectively, to the shafts $a$, $b$, $c$, and $d$, $a^3$, $b^3$, $c^3$, and $d^3$ being locking-levers pivoted on eccentric studs adjustably mounted in the frame and carrying rollers $a^4$, $b^4$, $c^4$, and $d^4$, adapted to engage in the locking-notches of said disks and normally but yieldingly held against the disks by springs $a^5$ $b^5$ $c^5$ $d^5$, said springs connecting the free ends of said levers to a bar E, passing freely through a swiveled block $b^6$ upon the free end of lever $b^3$ and pivotally connected at its end to the pawl-lever D. The eccentric pivots of the levers permit of their exact adjustment with relation to the notches in the disks.

F indicates an elbow handle-lever pivoted to the frame, suitably held and limited in its movement by a spring-latch F' and pins $F^2$ $F^3$, secured in the frame. This lever F has pivoted to one of its arms a rod $F^4$, which passes loosely through a block $F^5$, swiveled in the pawl $D^3$, said block being between springs $F^6$ on said rod, whereby the pawl is yieldingly held on the rod and may be engaged with or disengaged from the ratchet-wheel $D^4$, whereby the intermittent rotation of the shafts $a$, $b$, $c$, and $d$ may be controlled by manipulating the hand-lever F without stopping the main shaft B of the machine. By the means described the shafts $a$, $b$, $c$, and $d$ are given an intermittent rotation, and the momentum is minimized by a friction-strap G, encircling a brake-wheel G' on the shaft $a$ and secured to the bracket $G^2$ on the frame.

H indicates the button-carrier in the form of a disk of sheet metal secured by screws or otherwise upon a hub H', mounted upon the shaft $a$ above the upper plate A' of the frame A. The disk is provided near its periphery with regularly-spaced button seats or openings, as at $h$, slotted out to the periphery, and that portion of the disk which contains these button-seats rests upon a brass ring $i$, resting upon an annular flange or rest I from plate A', (see Fig. 2,) said ring and annular rest being omitted in part immediately underneath a point, as at $h^2$ in Fig. 1, to permit the buttons to automatically drop out of their seats after they have been colored into any suitable chute or other receptacle.

J, K, and L indicate the hubs of the stencil-carriers, secured, respectively, upon shafts $b$, $c$, and $d$ and provided with radial peripheral openings regularly spaced and in number and position corresponding with the button-seats in the button-carrier. Into each of these radial openings is secured a plug, as at J' K' L', in the outer end of each of which is pivoted on a horizontal pin an arm, as at $J^2$ $K^2$ $L^2$ and best shown in Figs. 2, 6, and 7. To each of said arms is secured, as by a screw $i^2$, a spring $i^3$, which is seated in a groove in the bottom of the arm, as at $K^2$, Fig. 7. A thin sheet-metal arm extends beyond the end of the arm to which it is attached and ends in circular or disk forms, as at $J^3$ $K^3$ $L^3$, each such disk being a holder of a stencil-plate of much thinner metal soldered thereto, as at $J^4$ $K^4$ $L^4$, Figs. 6, 7, and 8, the holder being centrally cut away to expose the stencil-plate, said thin sheet-metal arm being provided with an opening to fit over a pin $i^4$ and is slipped into position in the groove in arm $K^2$ and held therein by spring $i^3$ in a manner to permit of its ready removal when desired to change it for a holder for stencil-plates for different sizes of buttons, the several stencil-plates being slotted or cut to form a suitable single design or combination design, according as one or more sets are used, it being understood that there may be only one or any number of stencil-carriers and that the design may be colored on the button by the use of a single carrier or any series of carriers, the number of series depending upon the combination design to be made. These stencil-carriers are so placed with relation to the button-carrier that in their intermittent rotation with their shafts a holder of each stencil-carrier when at rest will be immediately above a button-seat (see Figs. 1 and 2) and below a pigment-supply, as hereinafter described. As the stencil-holders rotate they rest upon suitably-arranged bars, as at $j$, $k$, and $l$, during the whole of their rotatory movement, these bars being curved downward and again upward for a portion of their extent, beginning at the points where the holders move off the button-carrier, to permit the holders to drop by gravity into and pass through suitable cleaning solutions contained in tanks $j'$ $k'$ $l'$. After the holders are lifted out of the solutions they pass along over these bars $j$ $k$ $l$, (see Figs. 1 and 9,) which hold them well above the level of the button-carrier, until they reach their positions of rest over the button-seats, when they drop into notches, as at $j^3$, Fig. 9, with the stencil very close above the button in the carrier. The notches $j^3$ at their exit edges are beveled off, as at $k^3$, Fig. 9, and this assists the rise of the holders out of the notches; but the raising is principally effected by pins, as at $l^3$, Fig. 7, in arms $J^2$ $K^2$ $L^2$, which at this moment pass over rollers $j^4$, journaled in the upper ends of fixed pillars $K^4$, Figs. 2 and 9. After the holders are raised out of the baths they pass over hot-air sprays or jets, as at $k^6$ in Fig. 10, and are quickly dried, these jets being supplied with hot air under pressure from any suitable source through pipes $j^2$ $k^2$ $l^2$. The bath is boiling when the stencil passes through.

Loosely journaled on shaft $a$ above the button-carrier is the carrier M for as many reservoirs of liquid pigment or color as there are series of stencil-holders, one of such reservoirs being indicated at M', Fig. 13, and said reservoirs being removably held in clamps $m$ $n$ $o$ of the carrier M by suitable clamp-screws, Fig. 1. These pigment-reservoirs do not rotate with the button-carriers and stencil-carriers, but each reservoir contains a pigment or other liquid for use with a particular series of stencils and is maintained practically in position over the button when covered by a stencil of that series. It is desirable, however, that the pigment-reservoirs shall not be over the buttons when the stencils are in position thereon, and provision is made for oscillating the pigment-carrier slightly forward when the stencils are taking their working positions and back again to pass the reservoirs over the stencils while in such position by mechanism now to be described.

P, Figs. 1, 4, and 12, indicates a vertical rock-shaft suitably journaled in the frame of the machine and having a radial arm P', (consisting of two parts hinged together for facilitating a change of button-carrier,) secured at its upper end and provided with a slot $P^2$, embracing a pin $P^3$, secured to the pigment-carrier. At its lower end the shaft P carries another radial arm $p$, Figs. 4 and 12, which is provided at its outer end with a pivoted latch $p'$, actuated by a spring $p^2$ to normally throw its outer end downward into position to cause it to engage over a catch-block $p^3$, secured on the under side of pawl-lever D. When the pawl-lever is actuating the several carriers, as before described, it carries the latch $p'$ and arm $p$ with it and rocks the shaft $p$ a short distance forward, thus causing arm P' to move the pigment-carrier in the same direction and carry each pigment-reservoir a slight distance beyond its stencil and button. When the button is seated, the latch $p'$ comes in contact with a trip-pin $p^4$, secured to the frame, which disengages the latch from catch-block $p^3$ and permits a spring $p^5$ to draw arm $p$ back, thus giving a reverse movement to the pigment-carrier and carrying the pigment-reservoirs back over the stencils resting on the buttons. It is during this reverse movement that pigment is sprayed through the stencil-plates, it being desirable that the first matter sprayed should not strike the button, but that the spray be allowed to work slightly, so as to properly atomize the material before reaching its position directly over the button. This reverse movement is governed by a piston in an air-cylinder Q, the piston-rod Q' being pivoted to arm $p$, the cylinder being secured to the frame to slightly oscillate and having an adjustable air-escape valve $Q^2$. The latch $p'$ may be released by moving handle-lever F, when desired, a rod $q$, pivoted to the handle-lever and held by a spring $q'$ against a pin $q^2$, being properly placed for this purpose. When the pigment-reservoirs are passing during their reverse movement over the stencils and buttons, a charge of pigment is sprayed upon and through the openings of each stencil and upon its button, as before described, by a current of air which is allowed to escape, so as to be inoperative at all other times. The mechanism for this purpose is best shown in Figs. 3, 11, and 13, in which R indicates an air-chamber into which air is forced by pipe R' from any suitable source of air under pressure. $R^2$ is a normally closed spring escape-valve; $R^3$, the plug thereof, which carries a roller $R^4$ at its outer end. A flexible pipe S leads from the air-chamber to pipe S' of each of the pigment-reservoirs, as M', Fig. 13, and as long as valve $R^2$ is closed a current of air is caused to pass into the reservoir and a spray of pigment to issue from nozzle T, which in working position is passing back over the stencil in position on the button. U, Fig. 3, indicates a circular cam-disk on shaft $c$, having as many raising-cams $u$ as there are button-seats. The air-chamber R is supported, as by a bracket V, immediately over this cam-disk, and when the nozzle T is in position passing back over the stencil at rest upon a button the roller $R^3$ is in a notch between two raising-cams $u$, the valve is closed, and pigment is sprayed from the nozzle. At all other times the roller rests on one of the raising-cams and the valve is open, thus permitting the air to escape from the chamber and cutting off the spray from the nozzle.

All of the parts of the machine are timed to cause the different operations to be performed at the proper times, so that a button fed into the carrier either by hand or by any suitable feeding mechanism will be consecutively stenciled by one stencil of each series, so that, for instance, as shown in Fig. 8, it will be colored in stripes crossing it in one direction, then with stripes of the same or a different color crossing it at angles to those first made, and, when desired, first striped in another direction with shellac or other varnish by another stencil, finally appearing as shown at W in said figure.

As before stated, a single stencil or any number of series of stencils may be used and by simply changing the stencil-plates in the carriers any desired design or combination of designs may be stenciled upon the buttons and different button-carriers used for different-sized buttons.

By the operation of the described mechanism a stencil of every series used is simultaneously in working position over one of the series of buttons in the carrier and as many buttons are stenciled with one pattern as there are series of stencils used, the spraying from the whole number of pigment-reservoirs being simultaneously done, the stencils resting slightly off the buttons to prevent blurring of previous coloring. After each use of a stencil it is automatically cleaned before it comes into use again, thus keeping the stencils clean and assuring clean-cut work without clogging or gumming the mechanism. After a button is finished and after a stencil is cleansed any suitable means might be used to dry either or both, if thought desirable or necessary.

While I have described somewhat specifically an embodiment of my invention, I desire it to be understood that I do not confine myself to the exact details of construction, as it will be obvious to those skilled in the art after reading this specification that other mechanisms might be substituted for carrying out my general objects. While the claims of this application will be confined to the broad combinations for carrying out said general objects, the specific construction, arrangement, and combinations of parts for effecting the stenciling and stencil cleansing and the spraying operations will be claimed in concurrent applications of even date herewith numbered 103,415 and 103,416.

Having thus fully described my invention, what I claim as new, and desire to secure by Letters Patent of the United States, is—

1. The combination with a rotary button-carrier, a rotary stencil-carrier, and stencils thereon overlapping the edge of the button-carrier, of means for rotating the carriers in unison, and means for projecting liquid through the stencil when in its position above a button in the button-carrier.

2. The combination with a button-carrier, and a stencil-carrier, of means for moving them intermittently in unison, and means for projecting liquid through the stencil when at rest in its position above the button in the carrier.

3. The combination with a button-carrier, and a stencil-carrier, of means for moving them intermittently in unison, a liquid-reservoir, and means for projecting liquid therefrom through the stencil when the stencil is in its position above the button in the reservoir.

4. The combination with a button-carrier, a stencil-carrier, and means for moving them intermittently in unison, of a liquid-reservoir, means for moving it into position over a stencil and button at rest in their carriers, and means for projecting liquid from the reservoir through the stencil in said position.

5. The combination with a button-carrier having button-seats near its edge, a stencil-carrier adjacent to the button-carrier, stencils attached to the carrier projecting over the button-seats, means for intermittently moving the stencils over the button-seats, a liquid-reservoir and means for projecting liquid therefrom through a stencil in position over a button-seat.

6. The combination with a button-carrier and a stencil-carrier secured to parallel shafts, of button-seats near the periphery of the button-carrier, stencils carried by their carrier and projecting over said button-seats, a liquid-reservoir and means for projecting liquid therefrom through a stencil when in position over a button in one of the seats.

7. The combination of a button-carrier, a stencil-carrier and means for causing them to move intermittently in unison to bring a stencil into position over a button, of means for projecting liquid through the stencil when in position and means for cleansing the stencil after each operation.

8. The combination of two parallel shafts, a button-carrier secured to one shaft, a stencil-carrier secured to the other shaft, means for causing the shafts to rotate intermittently in unison, means for holding the shafts at rest when a stencil is over a button, and means for projecting liquid through the stencil while at rest.

9. The combination with a button-carrier, and a plurality of stencil-carriers, of means for intermittently moving all the carriers in unison, a liquid-reservoir for each stencil-carrier, and means for projecting liquid from each reservoir through one of its stencils while in position over a button-carrier.

10. The combination with a button-carrier and a plurality of stencil-carriers, of means for intermittently moving all of the carriers in unison and simultaneously bringing a stencil of each carrier to rest over a button in the button-carrier.

11. The combination with a button-carrier and a plurality of stencil-carriers, of means for intermittently moving all of the carriers in unison and simultaneously bringing a stencil of each carrier to rest over a button in the button-carrier, a liquid-reservoir for each stencil-carrier, and means for simultaneously projecting liquid from the reservoir through each positioned stencil upon its button in the carrier.

12. The combination with a button-carrier provided with a button-seat and a plurality of stencils in line of movement of the seat, of means for intermittently moving the carrier to bring the seat into position consecutively under all of said stencils, and means for projecting liquid through each stencil when in position over a button in the seat.

13. The combination with a button-carrier provided with a button-seat and a plurality of stencils in line of movement of the seat, of means for intermittently moving the carrier and the stencils to bring the seat into position consecutively under all of said stencils, and means for projecting liquid through each stencil when in position over a button in the seat.

14. The combination with a vertical shaft, and a button-carrier secured thereto and having button-seats annularly located near its periphery, of a plurality of vertical shafts arranged around the button-carrier shaft, a stencil-carrier secured to each of the surrounding shafts, stencils attached to each carrier equal in number and spaced to correspond in position with the button-rests, means for rotating all the shafts in unison and causing a stencil of each carrier to simultaneously rest in position over a button-rest, and means for projecting liquid simultaneously through all of the resting stencils.

15. The combination with a vertical shaft, a button-carrier secured thereon, a parallel shaft, a stencil-carrier secured thereon, and a notched disk secured on each of said shafts, of a lever pivoted to the frame adjacent to each of said disks, a roller on each lever, springs for normally holding said rollers against the peripheries of the disks, means for intermittently rotating the shafts in unison and means for increasing the tension of the springs during each movement of the disks.

16. The combination with a vertical shaft, a button-carrier secured thereon, a parallel shaft, a stencil-carrier secured thereon, and a notched disk secured on each of said shafts, of a lever pivoted to the frame adjacent to each of said disks, a roller on each lever, springs for normally holding said rollers against the peripheries of the disks, gearing connecting the shafts, a ratchet-wheel on the button-carrier shaft, a pawl-lever pivoted to the frame, a pawl thereon engaging the ratchet-wheel, means for oscillating the pawl-lever, and a bar attached to the pawl-lever and connected to the springs.

Witness my hand, this 31st day of March, 1902, in the presence of two subscribing witnesses.

JOHN HORMBY.

Witnesses:
EDWIN J. PERRIN, Jr.,
R. F. BUNKER.